US009844003B2

(12) United States Patent
Sen et al.

(10) Patent No.: US 9,844,003 B2
(45) Date of Patent: *Dec. 12, 2017

(54) COOPERATIVE POWER SAVINGS AMONG MOBILE COMPUTING DEVICES

(71) Applicant: Apple Inc., Cupertino, CA (US)

(72) Inventors: Anandamoy Sen, Cupertino, CA (US); Arvind Swaminathan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/060,470

(22) Filed: Mar. 3, 2016

(65) Prior Publication Data

US 2016/0262103 A1   Sep. 8, 2016

Related U.S. Application Data (63) Continuation of application No. 14/321,703, filed on Jul. 1, 2014, now Pat. No. 9,282,516.

(51) Int. Cl.
*H04B 1/38* (2015.01)
*H04W 52/02* (2009.01)
(Continued)

(52) U.S. Cl.
CPC ..... *H04W 52/0229* (2013.01); *H04L 43/0811* (2013.01); *H04L 65/1006* (2013.01);
(Continued)

(58) Field of Classification Search
CPC ..... H04W 84/02; H04W 84/18; H04W 84/20; H04W 8/005; H04W 8/26; H04W 4/005;
(Continued)

(56) References Cited

U.S. PATENT DOCUMENTS 7,818,029 B2 * 10/2010 Sanguinetti .......... H01Q 1/2291
370/339
8,340,580 B1 * 12/2012 Epstein ................ H04B 1/1027
455/114.2
(Continued)

FOREIGN PATENT DOCUMENTS

WO   WO2015103048 A1   7/2015
WO   WO2015120625 A1   8/2015

OTHER PUBLICATIONS

Derek R. Kumar, System and Method for Selective Timer Rate Limiting, U.S. Appl. No. 13/895,264 dated May 15, 2013.
(Continued)

*Primary Examiner* — Jean Gelin
(74) *Attorney, Agent, or Firm* — Downey Brand LLP (57) ABSTRACT

Disclosed herein is a technique for enabling mobile computing devices to share observation information using low-energy communication protocols. This observation information can include network connectivity information and GPS location information that is either known to or being sought out by a mobile computing device. When observation information (if any) maintained by a mobile computing device does not satisfy a threshold level of confidence, the mobile computing device can query neighboring mobile computing devices for corresponding observation information that satisfies the threshold level of confidence. Conversely, the mobile computing device can be configured to advertise observation information to the neighboring mobile computing devices when the observation information satisfies the threshold level of confidence. In this manner, the mobile computing devices can collaboratively share information in an attempt to reduce the significant workload that is otherwise required when working in isolation to establish network connectivity and determine GPS location information.

20 Claims, 7 Drawing Sheets

(51) Int. Cl.
*H04L 29/06* (2006.01)
*H04L 12/26* (2006.01)
*H04W 4/00* (2009.01)
*H04W 4/02* (2009.01)
*H04W 4/20* (2009.01)
*H04W 84/20* (2009.01)
*H04W 84/18* (2009.01)
*H04W 84/00* (2009.01)
*H04W 84/12* (2009.01)

(52) U.S. Cl.
CPC ......... *H04L 65/1073* (2013.01); *H04W 4/008* (2013.01); *H04W 4/023* (2013.01); *H04W 4/206* (2013.01); *H04W 84/005* (2013.01); *H04W 84/12* (2013.01); *H04W 84/18* (2013.01); *H04W 84/20* (2013.01); *Y02B 60/50* (2013.01)

(58) Field of Classification Search
CPC ......... H04W 4/008; H04W 4/12; H04W 4/18; H04W 4/206; H04W 52/027; H04W 4/023; H04W 88/04; H04W 4/02; H04W 16/14
USPC ......... 455/414.1, 417, 418, 419, 421, 426.2, 455/444, 552.1, 453, 522, 456.1, 456.2, 455/456.31, 432.3
See application file for complete search history.

(56) References Cited

U.S. PATENT DOCUMENTS

| | | |
|---|---|---|
| 8,909,683 B1 | 12/2014 | Ledet |
| 8,938,222 B2 | 1/2015 | Morohoshi |
| 2004/0203792 A1* | 10/2004 | Shaheen ............ H04W 36/0083 455/444 |
| 2007/0055672 A1* | 3/2007 | Stevens ................ G06F 17/3087 |
| 2008/0305771 A1 | 12/2008 | Yajima et al. |
| 2011/0117907 A1* | 5/2011 | Hooli .................... H04W 72/02 455/422.1 |
| 2012/0079018 A1 | 3/2012 | Rottler et al. |
| 2013/0100819 A1* | 4/2013 | Anchan ................. H04W 48/20 370/241 |
| 2013/0109323 A1 | 5/2013 | Ruutu et al. |
| 2013/0109371 A1 | 5/2013 | Brogan et al. |
| 2013/0138746 A1* | 5/2013 | Tardelli ............... H04L 12/6418 709/206 |
| 2013/0190032 A1 | 7/2013 | Li |
| 2014/0065960 A1* | 3/2014 | Gang ................... H04B 5/0031 455/41.1 |
| 2014/0086125 A1 | 3/2014 | Polo et al. |
| 2014/0094119 A1* | 4/2014 | Stojanovski ...... H04W 52/0258 455/41.1 |
| 2014/0094122 A1* | 4/2014 | Etemad ................ H04W 76/02 455/41.2 |
| 2014/0134990 A1 | 5/2014 | Chou |
| 2014/0154986 A1 | 6/2014 | Lee et al. |
| 2014/0179233 A1 | 6/2014 | Kang et al. |
| 2014/0240122 A1 | 8/2014 | Roberts et al. |
| 2015/0187187 A1 | 7/2015 | Del Toro et al. |
| 2015/0187339 A1 | 7/2015 | Vaz Waddington |
| 2015/0312808 A1* | 10/2015 | Kiss .................... H04L 12/1407 370/331 |

OTHER PUBLICATIONS

"Prevention of multiple notifications across multiple devices"—An IP.com Prior Art Database Technical Disclosure No. IPCOM000241329D, electronic publication dated Apr. 17, 2015.

* cited by examiner

COOPERATIVE POWER SAVINGS AMONG MOBILE COMPUTING DEVICES

CROSS REFERENCE TO RELATED APPLICATIONS

This Application is a continuation of U.S. application Ser. No. 14/321,703, entitled "COOPERATIVE POWER SAVINGS AMONG MOBILE COMPUTING DEVICES," filed Jul. 1, 2014. The above identified application is incorporated by reference herein in its entirety for all purposes.

FIELD

The described embodiments set forth a technique for implementing cooperative power savings among mobile computing devices.

BACKGROUND

Recent years have shown a proliferation in the number of users who carry mobile computing devices (e.g., smartphones and tablets). Typically, users migrate to various locations throughout the day, and, as a result, clusters of handled computing devices tend to continually form and disintegrate. In general, the location of each cluster is static in nature—e.g., a cluster of mobile computing devices will typically exist during business hours for a coffee shop that provides WIFI. This cluster will grow and shrink in size throughout the day so long as patrons continue to visit the coffee shop. Notably, in more recent times, the locations of clusters have also become dynamic in nature, e.g., a cluster of mobile computing devices can form during a commercial airline flight that provides WIFI. In any event, a cluster represents a localized group of mobile computing devices that are continually attempting to achieve a common goal of providing useful features through different types of connectivity (e.g., WIFI, Global Positioning System (GPS), and cellular network connectivity).

Presently, mobile computing devices work in isolation to establish the aforementioned types of connectivity. Consider, for example, a user who visits an airport whose main WIFI network is not presently known to the user's mobile computing device. In this example, the mobile computing device will individually carry out a WIFI scan to identify all WIFI networks in range. Notably, these WIFI scans consume a considerable amount of energy and time, which is wasteful considering the WIFI scans often involve negotiating with WIFI networks that are password-protected and/or will not provide reliable connectivity. This not only degrades battery performance, but also imposes the user with the tedious task of experimenting with different WIFI networks in attempt to achieve connectivity. This is especially unfortunate considering there is likely at least one nearby mobile computing device that has already performed the heavy lifting involved in identifying and connecting to a reliable WIFI network.

SUMMARY

Representative embodiments set forth herein disclose techniques for enabling mobile computing devices to share "observation information" using low-energy communication protocols (e.g., Bluetooth Low Energy (BTLE)). This observation information can include, for example, network connectivity information and GPS location information that is either known to or being sought out by a mobile computing device. Specifically, when observation information (if any) maintained by a mobile computing device does not satisfy a threshold level of confidence, the mobile computing device can query neighboring mobile computing devices for corresponding observation information that satisfies the threshold level of confidence. Conversely, the mobile computing device can be configured to advertise observation information to the neighboring mobile computing devices when the observation information satisfies the threshold level of confidence. In this manner, the mobile computing devices can collaboratively share information in an attempt to reduce the significant workload that is otherwise required when working in isolation to establish network connectivity and determine GPS location information.

One embodiment sets forth a method for collaborating with a plurality of nearby computing devices to identify an approach for establishing a type of connectivity. The method is carried out at a mobile computing device, and includes the steps of, in response to receiving a request to establish the type of connectivity: transmitting, to the plurality of nearby computing devices, a request for observation information associated with the type of connectivity, receiving, from at least one nearby computing device of the plurality of nearby computing devices, a response that includes observation information associated with the type of connectivity, and carrying out the approach for establishing the type of connectivity based on the observation information. According to a first example scenario, the nearby computing devices can represent auxiliary devices (e.g., a tablet computer and a laptop) that complement the mobile device (e.g., a smart phone), where the mobile device and the auxiliary devices belong to a particular individual or group of individuals (e.g., a family). According to a second example scenario, at least one computing device can represent a computing device (e.g., a laptop) that belongs to a first user who is in proximity to a second user who is operating the mobile device.

Another embodiment sets forth a non-transitory computer readable storage medium configured to store instructions that, when executed by a processor included in a mobile computing device, cause the mobile computing device to collaborate with a plurality of nearby computing devices to identify an approach for establishing a type of connectivity. In particular, the mobile device carries out steps that include, in response to receiving a request to establish the type of connectivity: identifying that observation information associated with the type of connectivity is not known to the mobile computing device, listening for at least one advertisement transmitted by a nearby computing device, wherein the at least one advertisement comprises observation information that is associated with the type of connectivity, and, upon determining that the received observation information satisfies a threshold level of confidence: carrying out the approach for establishing the type of connectivity based on the observation information.

Yet another embodiment sets forth a mobile device that comprises a processor, at least one low-energy wireless interface, and at least one high-energy wireless interface. The mobile device also comprises a memory configured to store instructions that, when executed by the processor, cause the mobile device to carry out steps that include identifying a request to establish a connection using the at least one high-energy wireless interface. In response, the mobile computing device uses the at least one low-energy wireless interface to query nearby mobile computing devices for observation information that is associated with the connection, and receive, from at least one of the nearby mobile computing devices, observation information that is associated with the connection. Finally, the mobile computing device uses the at least one high-energy wireless interface to establish the connection based on the received observation information.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

A typical mobile computing device—such as a smartphone or a tablet—includes a variety of hardware components that enable the mobile computing device to provide an abundance of features that are beneficial to its user. The hardware components can include, for example, wireless hardware that enables the mobile computing device to interface with WIFI access points, cellular base stations (i.e., Radio Access Towers (RATs)), Bluetooth-enabled computing devices, and NFC-enabled computing devices. The hardware components can also include GPS hardware that enables the mobile computing device to interface with GPS satellites to calculate and provide a current GPS location to the user. Notably, the portable nature of the mobile computing device presents challenges with respect to providing reliable connectivity and GPS location accuracy without draining battery life. In particular, as the mobile computing device migrates between different locations, it must continually adjust to effectively interact with the different network conditions that are present. Unfortunately, and as described in greater detail below, this continual adjustment typically involves carrying out a variety of energy-consuming processes that degrade the overall battery performance of the mobile computing device.

One example of an energy-consuming operation involves a mobile computing device periodically performing a scan for WIFI networks that are available. These scans occur often since cellular network coverage/reliability continues to remain spotty at best—at least in the global aspect—and the effective approach for curing this deficiency continues to involve communicating instead through WIFI networks, if any, that are available. In general, it can also be preferable, even when cellular networks are available, to scan and connect to WIFI networks so that data consumption over cellular networks can be reduced, which can provide cost savings to users. Unfortunately, these WIFI scans can result in a substantial deterioration in the overall battery performance of mobile computing device. Moreover, these WIFI scans often yield a list of WIFI networks to which the mobile computing device has not previously connected. Consequently, the mobile computing device must undergo a trial and error process of connecting to different available WIFI networks, which can waste time and energy. For example, WIFI networks often can often be associated with a favorable received signal strength indication (RSSI) despite being unable to provide reliable service to connected devices (e.g., because of backhaul issues). This can often lead to a mobile computing device being tricked into routing data through a WIFI network that provides unfavorable connectivity even when a cellular network that provides favorable connectivity is available. This is unfortunate considering that at least one nearby mobile computing device is likely able to communicate WIFI observation data to the mobile computing device that can assist the mobile computing device in identifying a best approach for achieving connectivity.

Accordingly, one embodiment set forth herein involves configuring mobile computing devices to share, using low-energy communication protocols, WIFI observation information with one another in order to enhance the manner in which the mobile computing devices connect to WIFI networks. Specifically, each mobile computing device can be configured to dynamically build and manage WIFI observation information for different environments that are encountered by the mobile computing device. In particular, when a mobile computing device identifies a present environment, the mobile computing device can be configured to identify whether the WIFI observation information for the present environment satisfies a threshold level of confidence. When the mobile computing device determines that the WIFI observation information for the present environment does not satisfy the threshold level of confidence (e.g., a WIFI connection exists but no internet connection can be obtained), the mobile computing device can be configured to transmit, using low-energy communication protocols and to nearby mobile computing devices, a request for corresponding WIFI observation information that satisfies the threshold level of confidence (e.g., a WIFI connection exists and strong internet connection has been obtained). Conversely, when the mobile computing device determines that the WIFI observation information for the present environment does satisfy the threshold level of confidence, the mobile computing device can be configured to transmit, to the nearby mobile computing devices, and advertisement that includes the WIFI observation information.

Notably, the foregoing embodiment beneficially enables mobile computing devices with low-confidence WIFI observation information (or none at all) to exploit high-confidence WIFI observation information, if any, possessed by nearby mobile computing devices. This can be particularly useful in situations where a user owns multiple devices that are capable of communicating WIFI observation information between one another. An example scenario can include a user who owns an iPhone™ and an iPad™ by Apple™ where the iPhone™ and the iPad™ are configured to communicate WIFI observation information (as well as the other types of observation information set forth herein) between one another. This can be beneficial for a variety of reasons, especially considering that the iPad™ can be designated as the appropriate device for carrying out energy-intensive tasks like WIFI scanning. As a result, a reduction in the number of WIFI scans can be achieved while simultaneously enabling the mobile computing devices to increase the average connectivity success rate, thereby enhancing the overall user experience in many aspects.

Another example of an energy-consuming operation involves the mobile computing device attempting to establish cellular network connectivity when in an Out Of Service (OOS) condition. More specifically, when attempting to obtain cellular network connectivity (by registering with a cellular network), a mobile computing device typically carries out a series of scans in order to analyze network parameters and identify an approach for establishing a connection with at least one RAT that is configured to provide cellular network connectivity. Notably, the somewhat investigational nature of this multi-scan based approach not only renders establishing cellular network connectivity a time-intensive task, but an energy-consuming one as well. This is especially unfortunate considering that clusters of mobile computing devices likely exist within areas where cellular network connectivity is available, and, within each cluster, there likely exists a pattern across the manner in which each mobile computing device establishes and maintains cellular network connectivity.

Accordingly, another embodiment set forth herein involves configuring mobile computing devices to share, using low-energy communication protocols, cellular observation information with one another in order to enhance the manner in which the mobile computing devices connect to cellular networks. Specifically, each mobile computing device can be configured to dynamically build and manage cellular observation information for different environments that are encountered by the mobile computing device. The cellular observation information is utilized by the mobile computing device in a manner similar to the WIFI observation information previously described herein. In particular, the mobile computing device is configured to request, from neighboring mobile computing devices and using low-energy communication protocols, high-confidence cellular observation information for a given environment when the mobile computing device possesses corresponding cellular observation information that is low-confidence. Conversely, when the mobile computing device possess high-confidence cellular observation information, the mobile computing device is configured to advertise, to neighboring mobile computing devices, the high-confidence cellular observation information for other mobile computing devices to utilize. In this manner, mobile computing devices that are in an OOS condition—e.g., when being powered-on or deactivating an airplane mode—can interface with neighboring mobile computing devices to potentially identify a more efficient approach for establishing cellular network connectivity. The more efficient approach can potentially include eliminating the need for a mobile device to perform a scan to identify available cellular connectivity when in an OOS condition. This can occur, for example, when high-confidence cellular observation information is available and can be used by the mobile device in lieu of performing the scan, which can provide considerable power savings.

Yet another example of an energy-consuming operation involves the mobile computing device attempting to perform an uplink transmission over an established cellular network connection. Typically, when a mobile computing device prepares to perform an uplink transmission, the mobile computing device is configured to reference and implement parameters that are associated with a most recent or a highest-performing uplink transmission that was carried out by the mobile computing device. This approach is flawed in many ways, however, due to the changes that rapidly occur within cellular network environments. For example, uplink conditions may drastically change when the mobile computing device moves from one location to another. Consequently, if a mobile computing device attempts to perform an uplink transmission based on aged uplink transmission parameters, the mobile computing device can, as a consequence, spend time and energy attempting to carry out the uplink transmission in a sub-optimal manner. This is especially unfortunate considering that there likely is a nearby mobile computing device that more recently performed the heavy lifting of identifying an optimal manner in which to carry out an uplink transmission.

Accordingly, yet another embodiment set forth herein involves configuring mobile computing devices to share, using low-energy communication protocols, uplink observation information with one another in order to enhance the manner in which the mobile computing devices perform uplink transmissions of data over established cellular network connections. Specifically, each mobile computing device can be configured to maintain an up-to-date record of parameters that yield a most efficient approach for carrying out an uplink transmission. The uplink observation information is utilized by the mobile computing device in a manner similar to both the WIFI observation information and the cellular observation information previously described herein. In particular, the mobile computing device is configured to request, from neighboring mobile computing devices and using low-energy communication protocols, high-confidence uplink observation information for a given environment when the mobile computing device possesses corresponding uplink observation information that is low-confidence. Conversely, when the mobile computing device possess high-confidence uplink observation information, the mobile computing device is configured to advertise, to neighboring mobile computing devices, the high-confidence uplink observation information for other mobile computing devices to utilize. In this manner, mobile computing devices that are preparing to perform an uplink transmission—e.g., when preparing to upload a digital photograph—can interface with neighboring mobile computing devices to potentially identify parameters that will likely enable the mobile computing device to perform the uplink transmission in a reliable and efficient manner.

Yet another example of an energy-consuming operation involves the mobile computing device attempting to achieve a full GPS satellite fix when attempting to determine GPS location information. This is a common problem that occurs in dense areas where there is a high level of signal reflection and/or deterioration, which makes it difficult for the mobile computing device to achieve a full GPS satellite fix (i.e., a clear line of sight to four GPS satellites). When this occurs, the mobile computing device consumes a considerable amount of energy by repeatedly attempting to obtain a fix for each of the missing GPS satellites. This is especially unfortunate considering that there likely is at least one nearby mobile computing device that has obtained GPS satellite fixes that can supplement at least one of the missing GPS satellite fixes.

Accordingly, yet another embodiment set forth herein involves configuring the mobile computing device to query other mobile computing devices for GPS observation information that can be used by the mobile computing device to increase the accuracy of the GPS location information. In particular, the mobile computing device is configured to share the GPS observation information using low-energy communication protocols in order to enhance the manner in which the mobile computing devices obtain GPS satellite fixes. Specifically, each mobile computing device can be configured to maintain GPS observation information that is utilized by the mobile computing device in a manner similar to the WIFI observation information, the cellular observation information, and the uplink observation information previously described herein. In particular, the mobile computing device is configured to request, from neighboring mobile computing devices and using low-energy communication protocols, high-confidence GPS observation information (e.g., three strong GPS satellite fixes) for a given environment when the mobile computing device possesses corresponding GPS observation information that is low-confidence (e.g., only one GPS satellite fix). Conversely, when the mobile computing device possess high-confidence GPS observation information, the mobile computing device is configured to advertise, to neighboring mobile computing devices, the high-confidence GPS observation information for other mobile computing devices to utilize. According to some embodiments, when the mobile computing device possess high-confidence GPS observation information, the mobile computing device can be configured to keep an internal GPS radio in a "warm" state so that the high-confidence GPS observation information can be up to date and be provided to nearby devices as needed. Moreover, the mobile computing device can be configured to identify when available GPS observation information is associated with a confidence level that satisfies a particular threshold, and forego establishing a GPS satellite fix altogether. According to the foregoing manners, mobile computing devices can collaborate with one another to collectively obtain and process GPS satellite fixes and more accurately determine GPS location information.

Accordingly, the foregoing approaches provide techniques for communicating useful information using low-energy communication protocols (e.g., BTLE) to help reduce the amount of time that is normally spent carrying out energy-consuming processes (e.g., WIFI scans, establishment of cellular network connectivity, uplink transmissions, GPS fixes, etc.). A more detailed discussion of these techniques is set forth below and described in conjunction with FIGS. 1-7, which illustrate detailed diagrams of systems and methods that can be used to implement these techniques.

Figure 1:
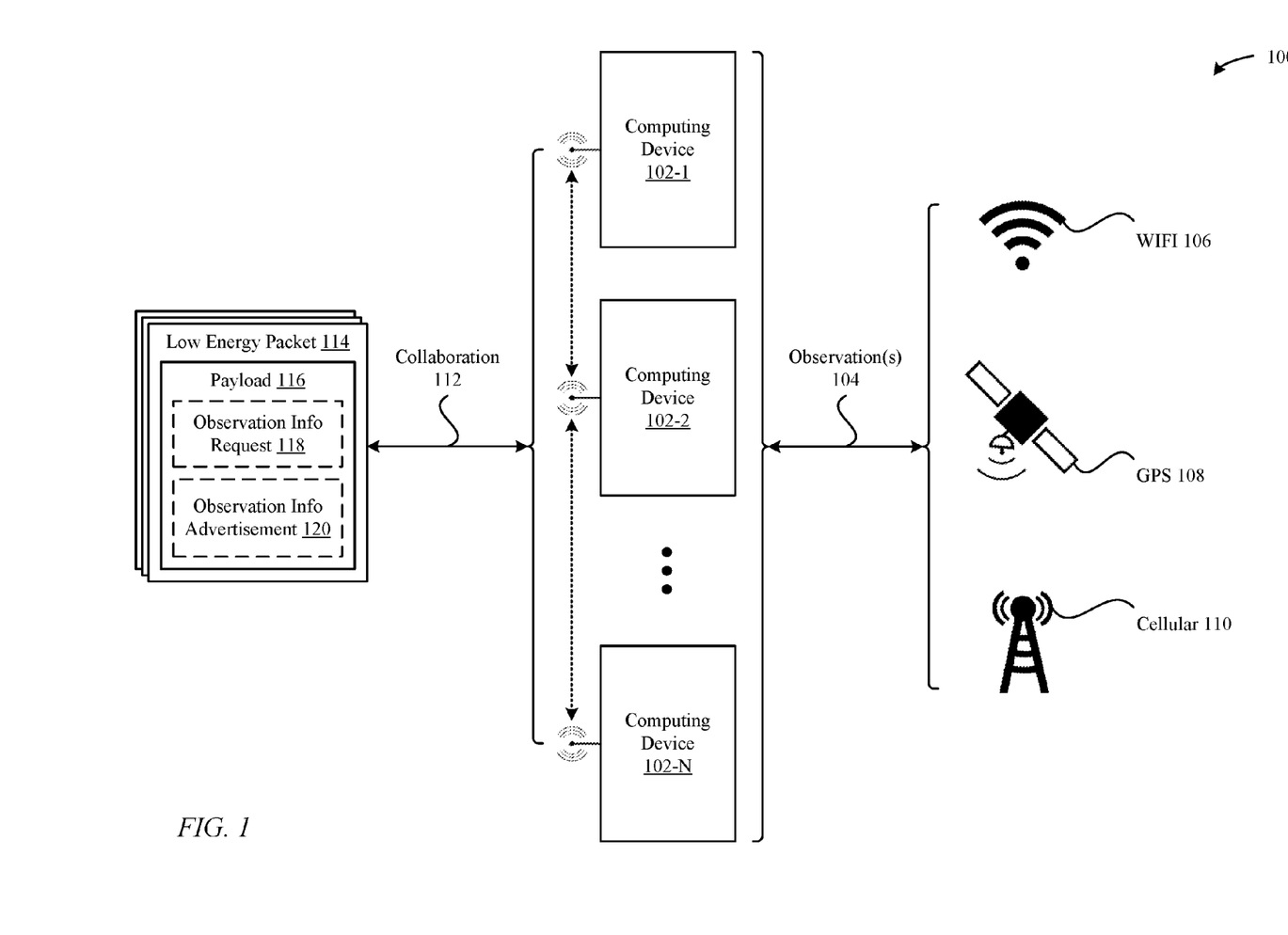
FIG. 1 illustrates a block diagram of different components of a system that is configured to implement the various techniques described herein, according to some embodiments.

FIG. 1 illustrates a block diagram of different components of a system 100 that is configured to implement the various techniques described herein, according to some embodiments. More specifically, FIG. 1 illustrates a high-level overview of the system 100, which, as shown, includes computing devices 102 that are configured to wirelessly interface with a variety of systems (represented by WIFI 106, GPS 108, and cellular 110). More specifically, and as described in greater detail herein, each of the computing devices 102 is configured to maintain observation information associated with each of these systems (represented by observations 104) and to communicate the observation information between one another using low energy packets 114 (represented by collaboration 112). A variety of communication protocols can be used to transmit the low energy packets 114, including BTLE and NFC protocols. Notably, however, the computing devices 102 set forth herein are not constrained to utilizing low energy protocols to communicate between one another. For example, in some instances, a computing device 102 can achieve power savings by communicating cellular related observation information and GPS related observation information to nearby computing devices 102 over an existing WIFI connection. Moreover, each of the computing devices 102 can be configured to communicate with one another over any number of "hops," i.e., the observation information can be passed between different computing devices 102—including computing devices 102 that do not directly utilize the observation information, but nonetheless pass on the observation information to surrounding devices. The manner in which the observation information is communicated over hops can be regulated in any matter, e.g., limiting the observation information to a particular number of hops, limiting the observation information to a total transmission time, and the like.

As shown in FIG. 1, each low energy packet 114 includes a payload 116 that can be used to transport either an observation information request 118 or an observation information advertisement 120. The observation information request 118 can include any form of data that can be used to identify the type of observation being requested, e.g., an pre-defined index that represents a particular type of observation within a list of types of observation information. Alternatively, the observation information advertisement 120 can include observation information in any form, e.g., a data object whose structure is known to or can be deduced by computing devices 102 in order to process the data that comprises the observation information advertisement 120. As described in greater detail below, each computing device 102 can be configured to periodically transmit observation information (via observation information advertisements 120) when the observation information satisfies a threshold level of confidence. The periodic transmission of observation information can also be based on an activity level associated with the computing device 102, which can be based on, for example, motion sensors included in the computing device 102, a rate at which a user of the computing device 102 interacts with the computing device 102, and the like. Each computing device 102 can also be configured to transmit an observation request 118 for a particular type of observation information when the observation information, if any, possessed by the computing device 102 does not satisfy a threshold level of confidence.

Figure 2:
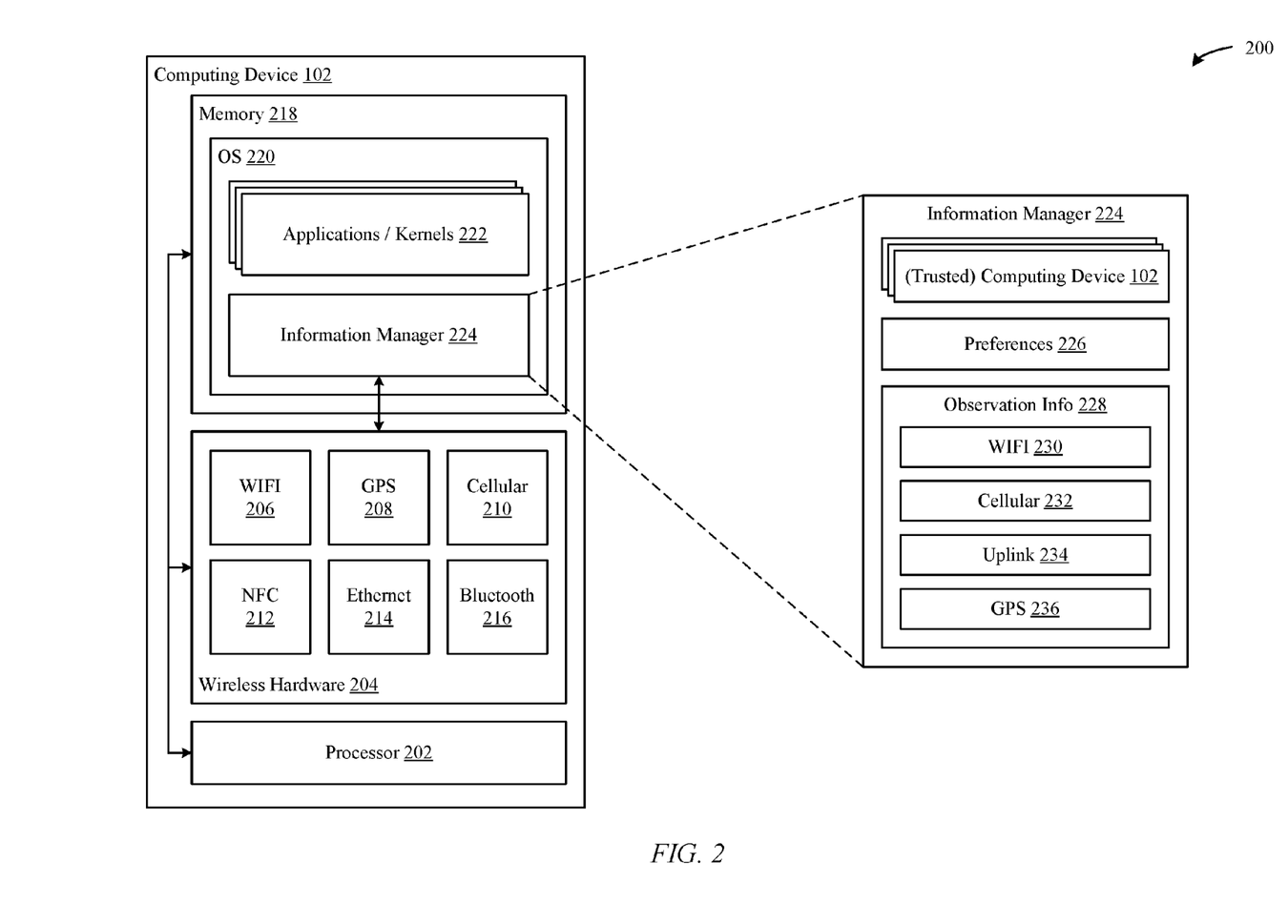
FIG. 2 illustrates a block diagram of a more detailed view of particular components of a computing device of FIG. 1, according to some embodiments.

FIG. 2 illustrates a block diagram of a more detailed view 200 of particular components of a computing device 102 of FIG. 1, according to some embodiments. As shown in FIG.

2, the computing device 102 can include a processor 202, wireless hardware 204, and a memory 218. In particular, the wireless hardware 204 can include a WIFI component 206, a GPS component 208, a cellular component 210, an NFC component 212, an Ethernet component 214, and a Bluetooth component 216. As also shown in FIG. 2, the processor 202, in conjunction with the memory 218, can execute an operating system (OS 220) that includes a variety of applications/kernels 222 for managing the various hardware components included in the computing device 102. The OS 220 also includes an information manager 224 that is configured to implement the various techniques described herein.

A detailed breakdown of the information manager 224 is also illustrated in FIG. 2. As shown, the information manager 224 can include a list of trusted computing devices 102, preferences 226, and observation information 228. The trusted computing devices 102 can represent computing devices 102 with which the computing device 102 regularly communicates and relies on for observation information. For example, if the computing device 102 represents a user's smartphone, the trusted computing devices 102 can include a tablet device that also belongs to the user. This is especially useful since the tablet device likely has a larger battery than the smartphone and can be designated as the responsible party for performing intensive tasks (e.g., WIFI scans) and communicating observation information to the smartphone via low energy packets 114. The preferences 226 represent a variety of information that dictates the manner in which the information manager 224 operates. For example, the preferences 226 can specify the type of observation information (if any) that is maintained, the rate at which observation information advertisements 120 are transmitted, parameters for identifying when to transmit an observation information request 118, when to enter into a listening mode for receiving and processing observation information advertisements 120, and the like. The preferences 226 can also enable the computing device 102 to manage how observation information requests and/or advertisements are handled by the computing device 102. For example, when the computing device 102 includes a battery that satisfies a threshold level of energy capacity, the computing device 102 can be configured to increase the rate at which observation information advertisements are transmitted, the type of observation information advertisements that are transmitted, and the like. Other overall hardware/software capabilities of the computing device 102 can also influence these factors, e.g., processing capacity, memory capacity, and the like. Moreover, the computing device 102 can be configured to identify a particular exit event upon which to cease the transmission of advertisements, e.g., when a specific condition is satisfied.

As further shown in FIG. 2, the observation information 228 can include WIFI observation information 230, cellular observation information 232, uplink observation information 234, and GPS observation information 236. It is noted that the observation 228 is not limited to the types of observation information illustrated in FIG. 2 and described herein, but can further include other types of observation information that can provide power savings when communicated between the computing devices 102.

Accordingly, FIGS. 1-2 provide an overview of architectures for the system 100 and the computing device(s) 102, which, as set forth above, enable the implementation of the various techniques set forth herein. FIGS. 3-6, which are described in detail below, illustrate different methods for requesting/advertising observation information 228 between the computing devices 102. In particular, each method sets forth a different framework that can be used to organize the manner in which a different type of observation information 228 is communicated between the computing devices 102.

Figure 3:
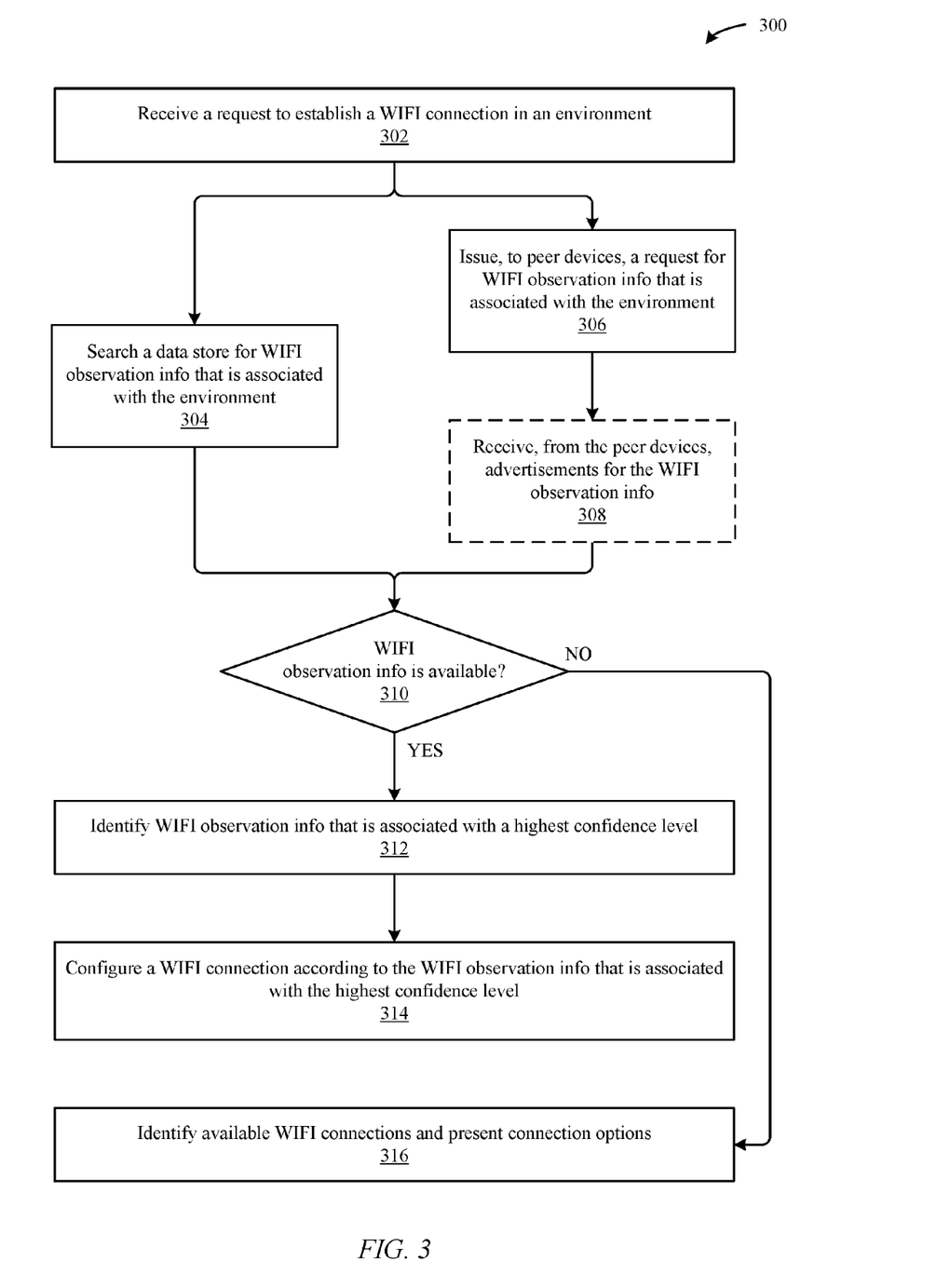
FIG. 3 illustrates a method for communicating WIFI observation information between computing devices, according to one embodiment.

FIG. 3 illustrates a method 300 for communicating WIFI observation information 230 between computing devices 102, according to one embodiment. As shown, the method 300 begins at step 302, where the information manager 224 within a particular computing device 102 receives a request to establish a WIFI connection in an environment. This request can be generated, for example, when an application/kernel 222 executing on the computing device 102 detects a condition where a WIFI connection does not exist but is desirable (e.g., when attempting to download a large file). At step 304, the information manager 224 searches a data store—such as the observation information 228 managed by the information manager 224—for WIFI observation information 230 that is associated with the environment. At a similar time, the information manager 224 also issues, to peer computing devices 102 (if any), a request for WIFI observation information 230 that is associated with the environment. In this manner, the information manager 224 can subsequently compare all WIFI observation information 230 that is available in order to establish a best-case approach for connecting to a WIFI network.

Notably, step 308 of FIG. 3 is optional, and represents a scenario where peer computing devices 102 are present and possess the requested WIFI observation information 230. In particular, when this scenario occurs, the computing device 102 receives observation information advertisements 120 that include WIFI observation information 230. At step 310, the information manager 224 determines whether the WIFI observation information 230 is available. In particular, if the information manager 224 cannot locate WIFI observation information 230 locally within the observation information 228—and, further, does not receive WIFI observation information 230 from peer computing devices 102, then the information manager 224 passes the responsibility back to the user and presents a list of connection options.

Alternatively, if, at step 310, the information manager 224 determines that the WIFI observation information 230 is available, then the method 300 proceeds to step 312, where the information manager 224 identifies the available WIFI observation information 230 that is associated with a highest confidence level. Notably, these confidence levels can be established according to a variety approaches that involve, for example, assigning values to different properties of available WIFI networks and summing them together to effectively identify a WIFI network that is best-fit for the typical computing device 102. Considerations for each WIFI network can include, for example, whether or not a connection has been successfully established with the WIFI network, whether or not a Domain Name Service (DNS) lookup has been successfully carried out through the WIFI connection, the total uptime of the WIFI connection, the signal strength of the WIFI connection, the average speed of the WIFI connection, imposed limitations on the WIFI connection (e.g., the number of blocked web page categories), and the like.

At step 314, the information manager 224 configures a WIFI connection according to the WIFI observation information 230 that is associated with the highest confidence level. Alternatively, each computing device 102 can be configured to process the different WIFI observation information 230 based on specific needs that the computing device 102, instead of outright selecting the WIFI observation information 230 that is associated with the highest confidence level. For example, preferences 226 of a particular computing device 102 can specify that the most important aspect of a WIFI connection is the average speed of the WIFI connection as opposed to the total uptime of the WIFI connection, and choose to connect to a particular WIFI network that is known to have the highest average speed. In this manner, each computing device 102 can implement its own flexible approach for utilizing the observation information advertisements 120 that are received by way of the method 300.

Figure 4:
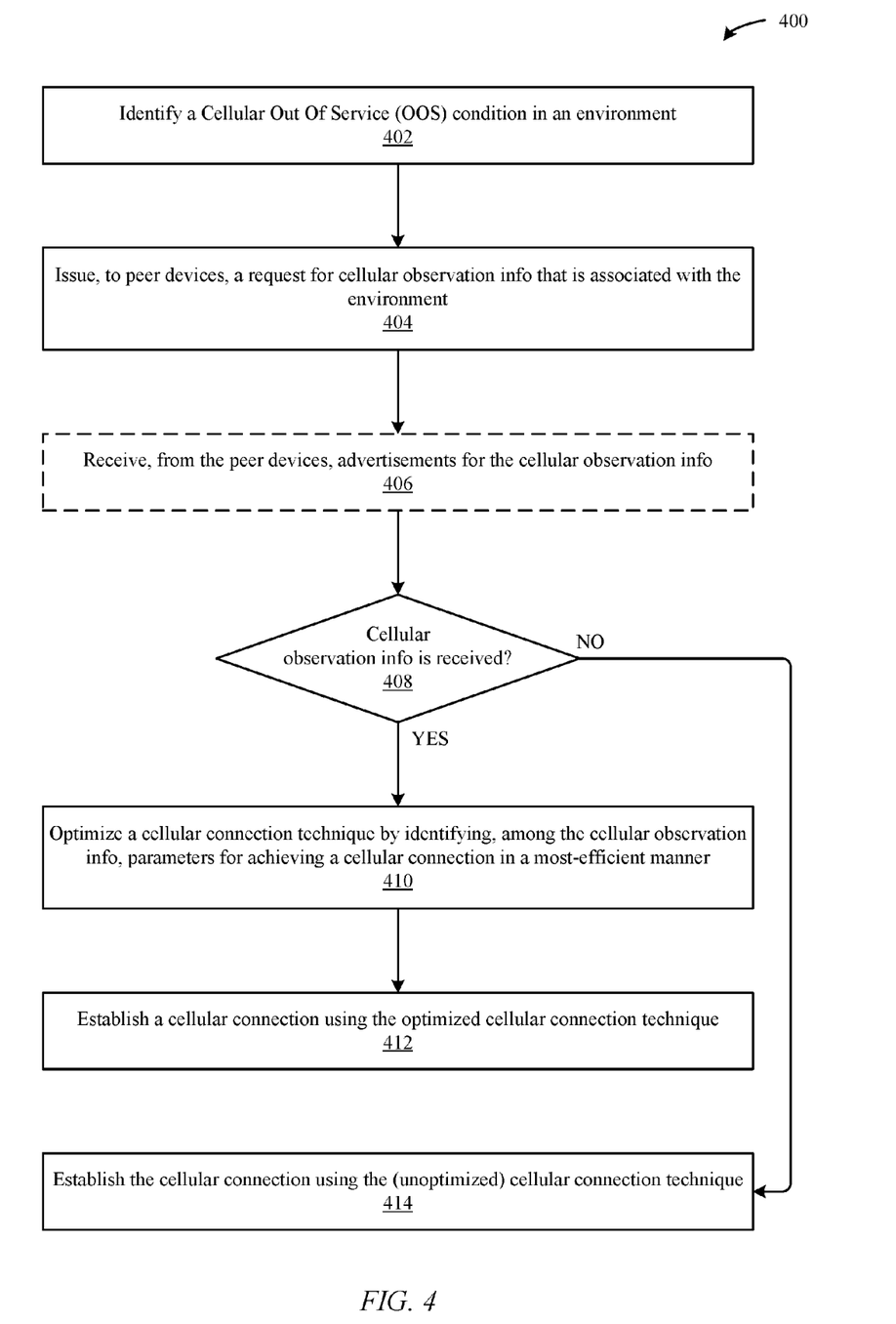
FIG. 4 illustrates a method for communicating cellular observation information between computing devices, according to one embodiment.

FIG. 4 illustrates a method 400 for communicating cellular observation information 232 between computing devices 102, according to one embodiment. As shown, the method 400 begins at step 402, where the information manager 224 identifies an OOS condition in an environment. This can occur, for example, when the computing device 102 on which the information manager 224 is executing is powering-on, entering back into an area where cellular service is provided, transitioning out of airplane mode, and the like. At step 404, the information manager 224 issues, to peer computing devices 102, a request for cellular observation information 232 that is associated with the environment.

At step 406, the information manager 224 receives, from the peer computing devices 102, observation information advertisements 120 that include the requested cellular observation information 232. Notably, step 406 of FIG. 4 is optional, and represents a scenario where the peer computing devices 102 are present and possess the requested cellular observation information 232. At step 408, the information manager 224 determines whether any cellular observation information 232 is received. If, at step 408, the information manager 224 determines that cellular observation information 232 is received, then the method 400 proceeds to step 410. Otherwise, the method 400 proceeds to step 414, where the information manager 224 establishes a cellular connection using a cellular connection technique that is unoptimized.

At step 410, the information manager 224 optimizes the cellular connection technique by identifying, among the cellular observation information 232, parameters for achieving a cellular connection in a most-efficient manner. This optimization can be carried out, for example, assigning values to different properties of specified in the cellular observation information 232 to develop an approach that is best-fit for establishing a cellular connection in within the environment. Considerations can include, for example, identified RATs to which the peer computing devices 102 are connected, frequency bands that are being used by the peer computing devices 102, the relative locations of the peer computing devices 102, and the like. Finally, at step 412, the information manager 224 establishes a cellular connection using the optimized cellular connection technique.

Figure 5:
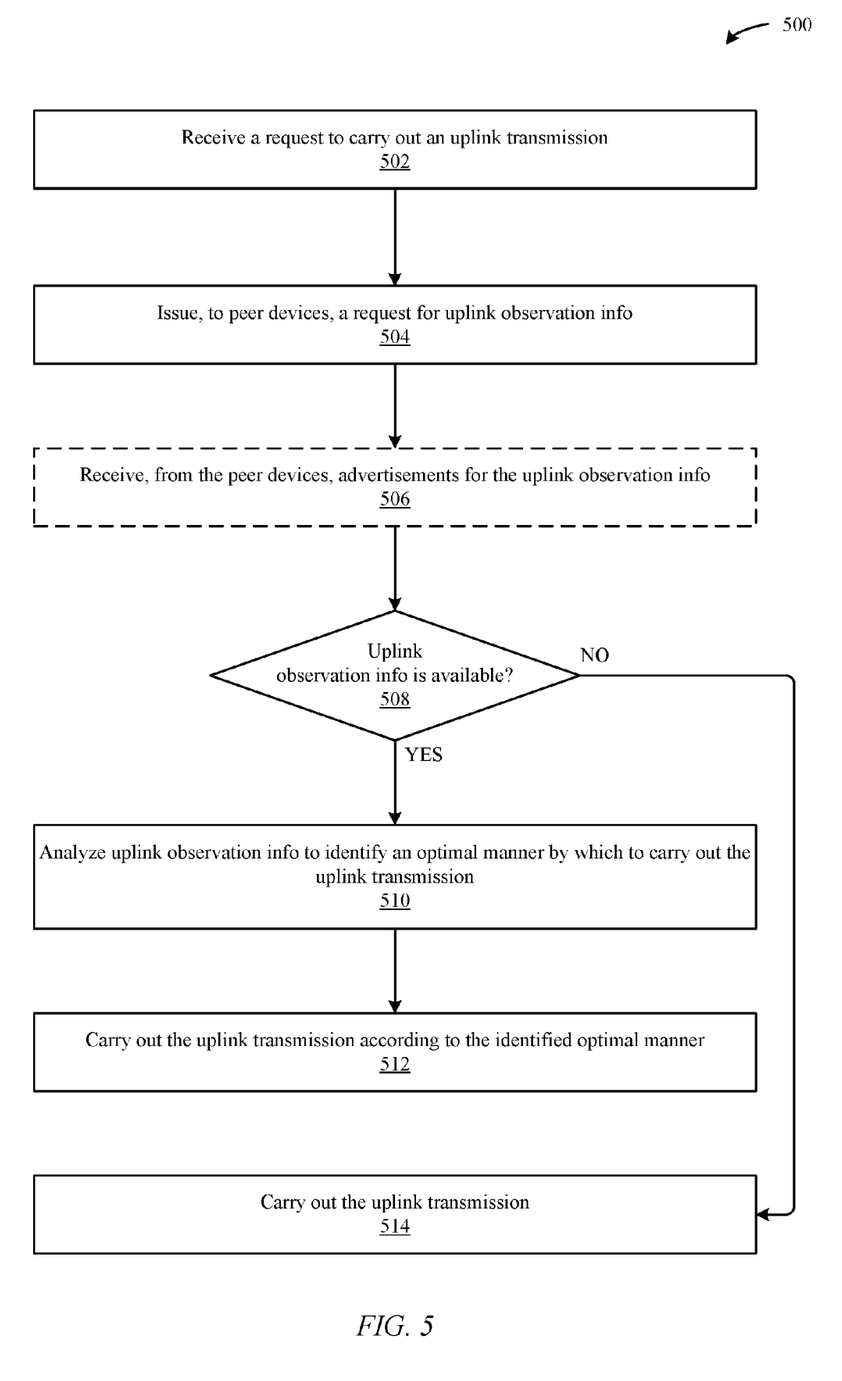
FIG. 5 illustrates a method for communicating uplink observation information between computing devices, according to one embodiment.

FIG. 5 illustrates a method 500 for communicating uplink observation information 234 between computing devices 102, according to one embodiment. As shown, the method 500 begins at step 502, where the information manager 224 receives a request to carry out an uplink transmission, e.g., to send an email that includes attachments. At step 504, the information manager 224 issues, to peer computing devices 102, a request for uplink observation information 234. At step 506, the information manager 224 receives, from the peer devices, advertisements for the uplink observation information 234.

Notably, step 506 of FIG. 5 is optional, and represents a scenario where peer computing devices 102 are present and possess the requested uplink observation information 234. In particular, when this scenario occurs, the computing device 102 receives observation information advertisements 120 that include uplink observation information 234. At step 508, the information manager 224 determines whether the uplink observation information 234 is available. In particular, if the information manager 224 does not receive uplink observation information 234 from peer computing devices 102, then the information manager 224 carries out the uplink transmission using existing techniques. This notion is represented at step 514 of FIG. 5. Otherwise, if, at step 508, the information manager 224 determines that uplink observation info 508 is available, then the method 500 proceeds to step 510, where the information manager 224 analyzes the uplink observation information 234 to identify a power profile for an optimal manner by which to carry out the uplink transmission. At step 512, the information manager 224 carries out the uplink transmission according to the identified optimal manner.

Figure 6:
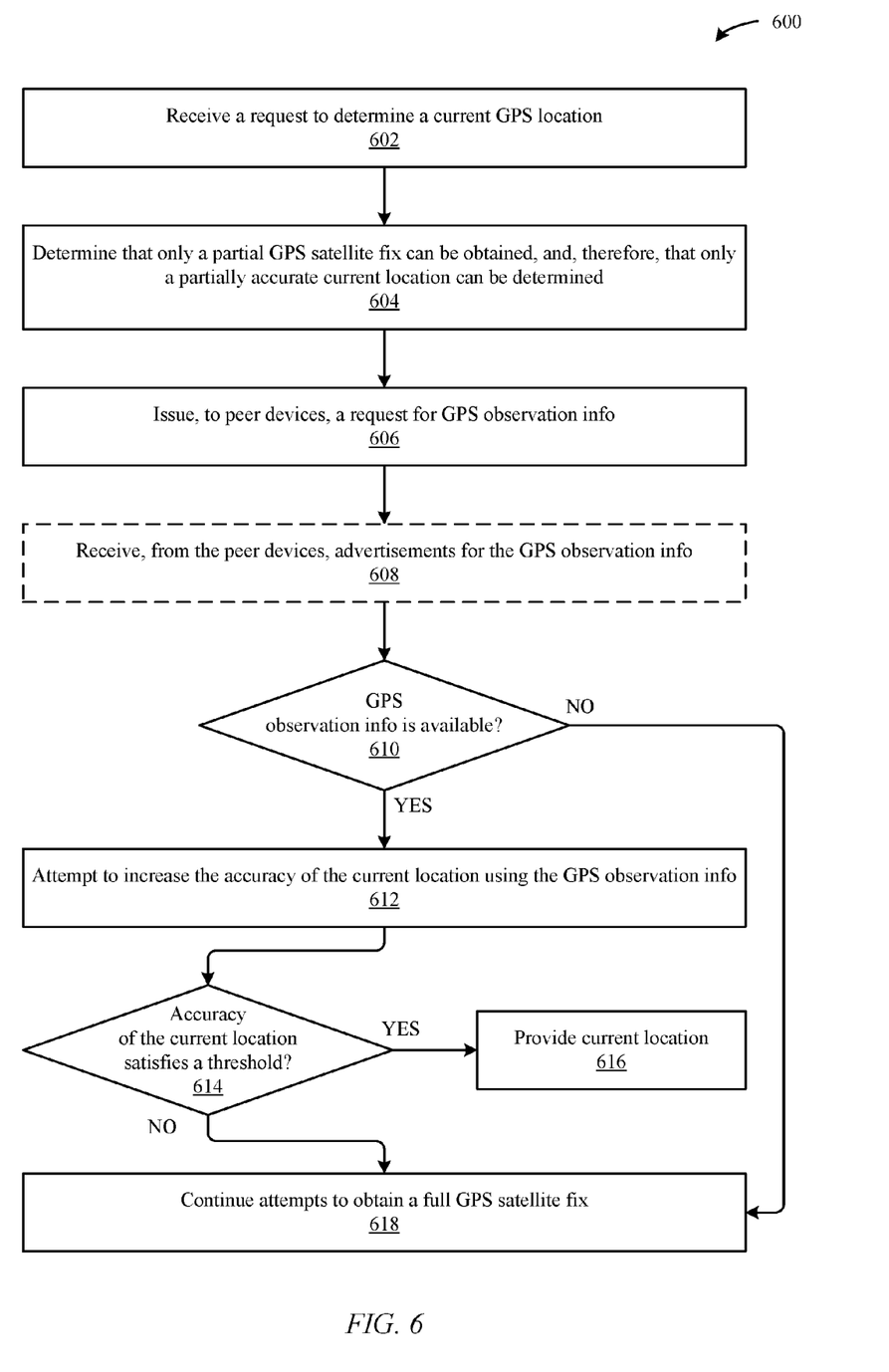
FIG. 6 illustrates a method for communicating GPS observation information between computing devices, according to one embodiment.

FIG. 6 illustrates a method 600 for communicating GPS observation information 236 between computing devices 102, according to one embodiment. As shown, the method 600 begins at step 602, where the information manager 224 receives a request to determine a current GPS location. At step 604, the information manager 224 determines that only a partial GPS satellite fix can be obtained, and, therefore, that only a partially accurate current GPS location can be determined. At step 606, the information manager 224 issues, to peer computing devices 102, a request for GPS observation information 236. At step 608, the information manager 224 receives, from the peer computing device 102, observation information advertisements 120 that include GPS observation information 236. Notably, step 608 of FIG. 6 is optional, and represents a scenario where peer computing devices 102 are present and possess the requested GPS observation information 236. In particular, when this scenario occurs, the computing device 102 receives observation information advertisements 120 that include GPS observation information 236. At step 310, the information manager 224 determines whether the GPS observation information 236 is available. If, at step 610, the information manager 224 determines that the GPS observation information 236 is not available, then the method 600 proceeds to step 618, where the information manager 224 continues attempting to obtain a full GPS satellite fix.

Otherwise, at step 612, the information manager 224 attempts to increase the accuracy of the current location using the GPS observation information 236. At step 614, the information manager 224 determines whether the accuracy of the current location satisfies a threshold. If, at step 614, the information manager 224 determines that the accuracy of the current location satisfies the threshold, then the method 600 proceeds to step 616, where the information manager 224 provides the current location. Otherwise, the method 600 proceeds to step 618 described above, where the information manager 224 continues attempts to obtain a full GPS satellite fix.

Figure 7:
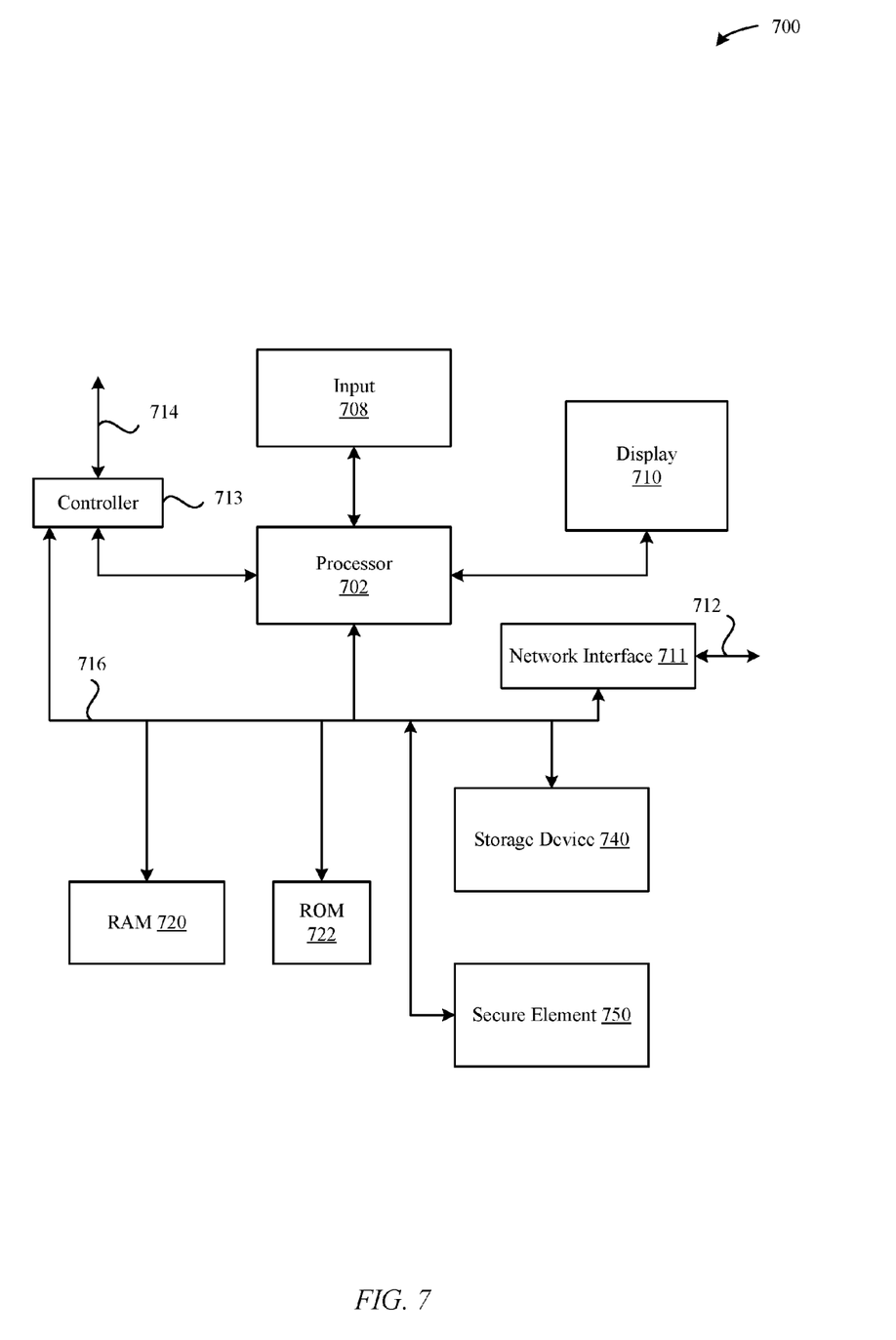
FIG. 7 illustrates a detailed view of a computing device that can be used to implement the various components described herein, according to some embodiments.

FIG. 7 illustrates a detailed view of a computing device 700 that can be used to implement the various components described herein, according to some embodiments. In particular, the detailed view illustrates various components that can be included in the computing devices 102 illustrated in FIG. 1. As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by the processor 702 to display information to the user. A data bus 716 can facilitate data transfer between at least a storage device 740, the processor 702, and a controller 713. The controller 713 can be used to interface with and control different equipment through and equipment control bus 714. The computing device 700 can also include a network/bus interface 711 that couples to a data link 712. In the case of a wireless connection, the network/bus interface 711 can include a wireless transceiver.

The computing device 700 also include a storage device 740, which can comprise a single disk or a plurality of disks (e.g., hard drives), and includes a storage management module that manages one or more partitions within the storage device 740. In some embodiments, storage device 740 can include flash memory, semiconductor (solid state) memory or the like. The computing device 700 can also include a Random Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing devices 102.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for identifying an optimal communication protocol for establishing a connection, the method comprising, at a portable electronic device:
   determining that a confidence level for establishing network connectivity at a location does not satisfy a threshold;
   transmitting, to a neighboring wireless-enabled device that is proximate to the portable electronic device, a request for observation information associated with different communication protocols available at the location;
   receiving, from the neighboring wireless-enabled device, at least:
      first observation information associated with a first communication protocol, and
      second observation information associated with a second communication protocol different from the first communication protocol, wherein the first and second observation information is based on observations by the neighboring wireless-enabled device of respective confidence levels for the first and second communication protocols at the location; and
   in response to receiving the first and the second observation information:
      determining the optimal communication protocol by comparing the respective confidence levels to the threshold, and
      establishing connectivity through the optimal communication protocol.

2. The method of claim 1, wherein the threshold is based on communication protocol requirements of the portable electronic device.

3. The method of claim 1, wherein determining the optimal communication protocol comprises determining which of the respective confidence levels for the first and the second communication protocols is associated with a strongest confidence level value.

4. The method of claim 2, wherein the communication protocol requirements is associated with a set of dynamic best fit criteria that includes one or more connection properties.

5. The method of claim 4, wherein the one or more connection properties include at least one of: signal strength, average speed, imposed limitations on a connection, successful history in establishing a connection, or total uptime.

6. The method of claim 1, wherein the first and the second communication protocols include at least one of a Wi-Fi connection, a cellular network registration connection, a cellular network uplink transmission, a Bluetooth connection, a Global Positioning System connection, or a Near Field Communication connection.

7. The method of claim 1, wherein the portable electronic device transmits the request for observation information to the neighboring wireless-enabled device through a low energy communication protocol.

8. At least one non-transitory computer readable medium configured to store instructions that, when executed by a processor included in a portable electronic device, cause the portable electronic device to:
   determine that a confidence level for establishing network connectivity at a location does not satisfy a threshold;
   transmit, to a neighboring wireless-enabled device that is proximate to the portable electronic device, a request for observation information associated with different communication protocols available at the location;
   receive, from the neighboring wireless-enabled device, at least: first observation information associated with a first communication protocol, and
      second observation information associated with a second communication protocol different from the first communication protocol, wherein the first and second observation information is based on observations by the neighboring wireless-enabled device of respective confidence levels for the first and second communication protocols at the location; and
   in response to receiving the first and the second observation information:
      determine an optimal communication protocol by comparing the respective confidence levels to the threshold, and establish connectivity through the optimal communication protocol.

9. The at least one non-transitory computer readable medium of claim 8, wherein the request for observation information is transmitted via a low-energy communication protocol.

10. The at least one non-transitory computer readable medium of claim 8, wherein prior to establishing connectivity through the optimal communication protocol, the processor further causes the portable electronic device to:
store the first and second communication protocols.

11. The at least one non-transitory computer readable medium of claim 8, wherein the first and the second communication protocols include at least one of a Wi-Fi connection, a cellular network registration connection, a cellular network uplink transmission, a Bluetooth connection, a Global Positioning System connection, or a Near Field Communication connection.

12. The at least one non-transitory computer readable medium of claim 8, wherein the threshold is based on communication protocol requirements of the portable electronic device.

13. The at least one non-transitory computer readable medium of claim 8, wherein determining the optimal communication protocol comprises determining which of the respective confidence levels for the first and the second communication protocols is associated with a strongest confidence level value.

14. The at least one non-transitory computer readable medium of claim 12, wherein the communication protocol requirements is associated with a set of dynamic best fit criteria that includes one or more connection properties.

15. A portable electronic device, comprising:
at least one processor; and
at least one memory configured to store instructions that, when executed by the at least one processor, cause the portable electronic device to:
determine that a confidence level for establishing network connectivity at a location does not satisfy a threshold;
transmit, to a neighboring wireless-enabled device, a request for observation information associated with different communication protocols available at the location;
receive, from the neighboring wireless-enabled device, at least:
first observation information that is associated with a first communication protocol, and
second observation information that is associated with a second communication protocol different from the first communication protocol, wherein the first and second observation information is based on observations by the neighboring wireless-enabled device of respective confidence levels for the first and second communication protocols at the location; and
in response to receiving the first and the second observation information:
determine an optimal communication protocol by comparing the respective confidence levels to the threshold, and
establish connectivity through the optimal communication protocol.

16. The portable electronic device of claim 15, wherein the portable electronic device includes a low-energy communication interface that is configured to implement at least one of Bluetooth Low Energy (BTLE) or Near Field Communication (NFC).

17. The portable electronic device of claim 15, wherein the portable electronic device includes a high-energy communication interface that is configured to implement at least one of a Wi-Fi connection or a cellular network connection.

18. The portable electronic device of claim 15, wherein the threshold is based on communication protocol requirements of the portable electronic device.

19. The portable electronic device of claim 15, wherein determining the optimal communication protocol comprises determining which of the respective confidence levels for the first and the second communication protocols is associated with a strongest confidence level value.

20. The portable electronic device of claim 18, wherein the communication protocol requirements is associated with a set of dynamic best fit criteria that includes one or more connection properties.

* * * * *